(12) United States Patent
Kim (10) Patent No.: US 11,045,033 B2
(45) Date of Patent: Jun. 29, 2021

(54) DOUBLE COOKING CONTAINER HAVING IMPROVED STABILITY AND HEATING EFFICIENCY

(71) Applicant: SAMMI INDUSTRIAL CO., Seoul (KR)

(72) Inventor: Cha Sik Kim, Seoul (KR)

(73) Assignee: Hyejin Kim, Seoul (KR)

( * ) Notice: Subject to any disclaimer, the term of this patent is extended or adjusted under 35 U.S.C. 154(b) by 320 days.

(21) Appl. No.: 15/172,998

(22) Filed: Jun. 3, 2016

(65) Prior Publication Data
US 2016/0278562 A1   Sep. 29, 2016

Related U.S. Application Data

(63) Continuation of application No. PCT/KR2014/011959, filed on Dec. 5, 2014.

(30) Foreign Application Priority Data

Dec. 5, 2013 (KR) .......................... 10-2013-0150355

(51) Int. Cl.
*A47J 27/00* (2006.01)
(52) U.S. Cl.
CPC .................................. *A47J 27/002* (2013.01)
(58) Field of Classification Search
CPC .. A47J 27/002; A47J 45/061; Y10T 29/49956
(Continued)

(56) References Cited

U.S. PATENT DOCUMENTS

| 51,208 A  | * | 11/1865 | Neynaber ............... A47J 27/10 |
| | | | 126/377.1 |
| 120,995 A | * | 11/1871 | O'Sullivan .......... A47G 19/027 |
| | | | 220/574.2 |

(Continued)

FOREIGN PATENT DOCUMENTS

| JP | 2013-043644 A | 3/2013 |
| KR | 10-0880154 B1 | 1/2009 |

(Continued)

OTHER PUBLICATIONS

International Search Report, PCT/KR2014/011959, dated Apr. 8, 2015, 5 pages.

*Primary Examiner* — Eric S Stapleton
(74) *Attorney, Agent, or Firm* — Baker & McKenzie (57) ABSTRACT

The present disclosure relates to a double cooking container having improved stability and improved heating efficiency. Particularly, the double cooking container has a double structure in which an inner cylinder is formed inside an outer cylinder, a heat retaining space formed by inserting the inner cylinder into the inside of the outer cylinder and thus maintaining a predetermined interval between the bottom of the outer cylinder and the bottom of the inner cylinder, and a side fluid channel formed between the outer cylinder and the inner cylinder to communicate with the heat retaining space, wherein a plurality of discharge holes communicating with the side fluid channel are formed in the outer cylinder, and the entire sectional area of the discharge holes is controlled to be within a predetermined range in order to implement high heating efficiency as well as ensure stability.

2 Claims, 4 Drawing Sheets

(58) Field of Classification Search
USPC .............. 99/325; 220/573.4; 29/525.06
See application file for complete search history.

(56) References Cited

U.S. PATENT DOCUMENTS

| | | | | |
|---|---|---|---|---|
| 241,301 A * | 5/1881 | Clarkson | ............... | A47J 27/04 |
| | | | | 126/369 |
| 525,933 A * | 9/1894 | Wood | ............... | A47J 27/10 |
| | | | | 126/377.1 |
| 2,255,134 A * | 9/1941 | Thomas | ............... | A01K 97/04 |
| | | | | 43/56 |
| 2,431,808 A * | 12/1947 | Kluit | ............... | A47J 45/08 |
| | | | | 220/755 |
| 2,440,128 A * | 4/1948 | Sullivan | ............... | A47J 27/0802 |
| | | | | 219/442 |
| 2,504,344 A * | 4/1950 | Morrison, Jr. | ............... | A47J 45/071 |
| | | | | 220/753 |
| 2,515,879 A * | 7/1950 | Korn | ............... | A47J 27/0802 |
| | | | | 219/440 |
| 2,521,463 A * | 9/1950 | Kircher | ............... | A47J 45/071 |
| | | | | 220/752 |
| 2,522,579 A * | 9/1950 | Le Rette | ............... | A47J 45/08 |
| | | | | 220/753 |
| 2,562,843 A * | 7/1951 | Grondahl | ............... | F24C 7/008 |
| | | | | 392/312 |
| 2,681,211 A * | 6/1954 | Reynolds | ............... | A47J 43/044 |
| | | | | 366/251 |
| 2,787,805 A * | 4/1957 | Kraemer | ............... | A47J 45/085 |
| | | | | 220/753 |
| 2,815,527 A * | 12/1957 | Hollaway, Jr. | ............... | A47J 45/061 |
| | | | | 220/753 |
| 2,979,760 A * | 4/1961 | Sladky | ............... | A47J 45/071 |
| | | | | 220/776 |
| 3,125,946 A * | 3/1964 | Falla | ............... | A47J 27/04 |
| | | | | 99/342 |
| 3,143,759 A * | 8/1964 | Kennedy | ............... | A47J 45/085 |
| | | | | 220/753 |
| 3,185,001 A * | 5/1965 | Viator | ............... | B25G 1/105 |
| | | | | 81/177.1 |
| 3,306,648 A * | 2/1967 | Serio | ............... | A47J 45/071 |
| | | | | 294/27.1 |
| 3,474,486 A * | 10/1969 | Serio | ............... | A47J 45/071 |
| | | | | 220/759 |
| 3,616,964 A * | 11/1971 | Yamazaki | ............... | A47J 45/071 |
| | | | | 220/753 |
| 3,641,992 A * | 2/1972 | Peyser | ............... | A47J 27/04 |
| | | | | 126/378.1 |
| 3,644,709 A * | 2/1972 | Hojo | ............... | A47J 37/015 |
| | | | | 219/439 |
| 3,648,887 A * | 3/1972 | Hartley | ............... | A47J 45/071 |
| | | | | 220/759 |
| 3,774,263 A * | 11/1973 | Day | ............... | A47B 95/02 |
| | | | | 220/753 |
| 3,823,307 A * | 7/1974 | Weiss | ............... | A47J 27/17 |
| | | | | 219/439 |
| 4,008,822 A * | 2/1977 | Carroll | ............... | A47J 45/061 |
| | | | | 220/752 |
| 4,010,736 A * | 3/1977 | Sacomani | ............... | A47J 27/04 |
| | | | | 126/369 |
| 4,032,032 A * | 6/1977 | Carroll | ............... | A47J 45/061 |
| | | | | 220/752 |
| 4,083,081 A * | 4/1978 | Witte | ............... | A47J 45/071 |
| | | | | 220/752 |
| 4,145,604 A * | 3/1979 | Carlsson | ............... | A47J 27/17 |
| | | | | 219/439 |
| 4,197,611 A * | 4/1980 | Bell | ............... | A47J 45/08 |
| | | | | 16/DIG. 12 |
| 4,331,127 A * | 5/1982 | Grosso | ............... | A47J 27/10 |
| | | | | 126/220 |
| 4,564,001 A * | 1/1986 | Maeda | ............... | A47J 27/002 |
| | | | | 126/390.1 |
| 4,565,296 A * | 1/1986 | Lam | ............... | A47J 45/061 |
| | | | | 220/752 |
| 4,604,989 A * | 8/1986 | Kita | ............... | A47J 36/20 |
| | | | | 126/369 |
| 4,643,325 A * | 2/1987 | Streit | ............... | A47J 47/18 |
| | | | | 220/770 |
| 4,667,085 A * | 5/1987 | Remmel | ............... | A47J 27/002 |
| | | | | 219/430 |
| 4,672,179 A * | 6/1987 | Onishi | ............... | G05D 23/26 |
| | | | | 219/436 |
| 4,680,829 A * | 7/1987 | Baumgarten | ............... | A47J 45/061 |
| | | | | 220/759 |
| 4,729,271 A * | 3/1988 | Kenigson | ............... | B25B 15/02 |
| | | | | 16/421 |
| 4,761,851 A * | 8/1988 | Day | ............... | A47J 45/071 |
| | | | | 220/752 |
| 4,781,302 A * | 11/1988 | Pearson | ............... | A47J 45/061 |
| | | | | 220/752 |
| 4,794,666 A * | 1/1989 | Kim | ............... | A47J 45/061 |
| | | | | 220/753 |
| 4,811,637 A * | 3/1989 | McCleary | ............... | B25B 23/16 |
| | | | | 16/426 |
| 4,823,980 A * | 4/1989 | Ejiri | ............... | A47J 27/10 |
| | | | | 126/378.1 |
| 4,825,505 A * | 5/1989 | Witte | ............... | A47J 45/072 |
| | | | | 16/425 |
| 4,838,244 A * | 6/1989 | Giles, Sr. | ............... | A47J 37/1247 |
| | | | | 126/376.1 |
| 4,926,521 A * | 5/1990 | Gagnepain | ............... | A47J 45/061 |
| | | | | 16/430 |
| D312,031 S * | 11/1990 | McCleary | ............... | D8/107 |
| 4,974,287 A * | 12/1990 | Fischbach | ............... | A47J 45/071 |
| | | | | 16/425 |
| 5,092,229 A * | 3/1992 | Chen | ............... | A47J 27/0811 |
| | | | | 126/348 |
| 5,125,393 A * | 6/1992 | Levitin | ............... | A47J 36/36 |
| | | | | 126/376.1 |
| 5,170,695 A * | 12/1992 | Chang | ............... | A47J 45/062 |
| | | | | 220/737 |
| 5,228,384 A * | 7/1993 | Kolosowski | ............... | A47J 27/10 |
| | | | | 126/369 |
| 5,277,326 A * | 1/1994 | Chiba | ............... | A47J 27/002 |
| | | | | 220/231 |
| 5,331,869 A * | 7/1994 | Webb | ............... | B25F 1/02 |
| | | | | 16/427 |
| 5,441,169 A * | 8/1995 | Petty | ............... | A47J 27/10 |
| | | | | 220/573.4 |
| 5,462,195 A * | 10/1995 | Marti | ............... | A47J 45/061 |
| | | | | 220/752 |
| 5,507,220 A * | 4/1996 | Jung | ............... | A47J 27/002 |
| | | | | 99/403 |
| 5,557,826 A * | 9/1996 | Kloppsteck | ............... | A47J 45/08 |
| | | | | 220/759 |
| 5,666,874 A * | 9/1997 | Wang | ............... | A47J 45/061 |
| | | | | 99/348 |
| 5,673,458 A * | 10/1997 | Raoult | ............... | A47J 45/061 |
| | | | | 16/425 |
| 5,699,614 A * | 12/1997 | Garneau, Sr. | ............... | A47G 21/02 |
| | | | | 30/142 |
| 5,730,231 A * | 3/1998 | Racodon | ............... | B25D 3/00 |
| | | | | 16/431 |
| D395,789 S * | 7/1998 | Dodane | ............... | D7/395 |
| 5,867,867 A * | 2/1999 | Kessler | ............... | A47J 45/061 |
| | | | | 16/425 |
| 5,913,966 A * | 6/1999 | Arnone | ............... | A47J 36/20 |
| | | | | 126/369 |
| 5,946,773 A * | 9/1999 | Esker | ............... | A23G 3/50 |
| | | | | 16/422 |
| 6,089,130 A * | 7/2000 | Wu | ............... | B25B 13/14 |
| | | | | 81/170 |
| 6,115,921 A * | 9/2000 | Garneau, Sr. | ............... | B25G 3/24 |
| | | | | 30/123 |
| 6,170,694 B1 * | 1/2001 | Munari | ............... | A47J 45/06 |
| | | | | 220/753 |
| 6,191,393 B1 * | 2/2001 | Park | ............... | A47J 27/002 |
| | | | | 219/439 |
| 6,305,272 B1 * | 10/2001 | Lin | ............... | A47J 27/002 |
| | | | | 126/369 |

(56) References Cited

U.S. PATENT DOCUMENTS

| | | | | |
|---|---|---|---|---|
| 6,320,166 B1* | 11/2001 | Park | ............ | A47J 27/002 219/428 |
| 6,325,238 B1* | 12/2001 | Munari | ............ | A47J 45/06 220/759 |
| 6,367,125 B1* | 4/2002 | Lin | ............ | B25G 1/063 16/436 |
| 6,405,619 B1* | 6/2002 | Lamond | ............ | B25G 3/18 16/110.1 |
| 6,415,945 B1* | 7/2002 | Zank | ............ | A47J 27/12 206/499 |
| 6,439,421 B1* | 8/2002 | Lin | ............ | A47J 45/071 16/425 |
| 6,467,645 B2* | 10/2002 | Park | ............ | A47J 27/002 220/592.28 |
| D468,583 S * | 1/2003 | Kerulis | ............ | D7/395 |
| 6,573,483 B1* | 6/2003 | DeCobert | ............ | A47J 36/32 219/506 |
| 6,631,824 B2* | 10/2003 | Park | ............ | A47J 27/002 220/573.1 |
| D482,233 S * | 11/2003 | Rae | ............ | D7/393 |
| D482,234 S * | 11/2003 | Rae | ............ | D7/394 |
| D482,567 S * | 11/2003 | Demers | ............ | D7/395 |
| D482,568 S * | 11/2003 | Demers | ............ | D7/395 |
| D485,120 S * | 1/2004 | Kight | ............ | D7/395 |
| D490,270 S * | 5/2004 | Pippel | ............ | D7/395 |
| D491,016 S * | 6/2004 | Rae | ............ | D7/395 |
| D493,061 S * | 7/2004 | Rae | ............ | D7/394 |
| 6,782,778 B2* | 8/2004 | Watson | ............ | B25B 7/00 81/177.1 |
| D496,219 S * | 9/2004 | Rae | ............ | D7/395 |
| 6,789,393 B2* | 9/2004 | Dais | ............ | B65D 43/021 62/112 |
| D507,931 S * | 8/2005 | Rae | ............ | D7/393 |
| 6,941,857 B2* | 9/2005 | McLemore | ............ | A47J 37/1209 99/403 |
| 6,942,383 B2* | 9/2005 | Kwon | ............ | A47J 45/068 374/141 |
| D518,331 S * | 4/2006 | Rae | ............ | D7/395 |
| D519,316 S * | 4/2006 | Plichon | ............ | D7/395 |
| 7,028,374 B2* | 4/2006 | Fiocco | ............ | A47J 45/071 16/422 |
| 7,059,240 B2* | 6/2006 | Kim | ............ | A47J 27/026 99/339 |
| 7,086,326 B2* | 8/2006 | Yokoyama | ............ | A47J 36/36 126/369 |
| 7,097,064 B2* | 8/2006 | Cheng | ............ | A47J 27/002 220/573.1 |
| D530,148 S * | 10/2006 | Knorr | ............ | D7/395 |
| 7,165,489 B1* | 1/2007 | Fernandez | ............ | A47J 27/02 126/373.1 |
| 7,166,822 B1* | 1/2007 | Chang | ............ | A47J 27/022 219/430 |
| 7,204,387 B2* | 4/2007 | Munari | ............ | A47J 45/061 16/425 |
| 7,216,413 B2* | 5/2007 | Cheng | ............ | A47J 27/002 220/573.1 |
| 7,412,922 B2* | 8/2008 | McLemore | ............ | A47J 37/1209 99/403 |
| 7,415,979 B1* | 8/2008 | Macri | ............ | A47J 37/0763 126/25 R |
| 7,490,732 B2* | 2/2009 | Wasserman | ............ | A47J 45/061 16/425 |
| 7,624,893 B2* | 12/2009 | Hoff | ............ | A47J 45/061 16/421 |
| 7,789,015 B2* | 9/2010 | Crow | ............ | A47J 45/061 126/373.1 |
| 8,689,680 B2* | 4/2014 | Park | ............ | A47J 27/022 126/274 |
| 2003/0116556 A1* | 6/2003 | Li | ............ | A47J 27/004 219/433 |
| 2004/0074395 A1* | 4/2004 | Serres Vives | ............ | A47J 36/2438 99/275 |
| 2004/0163548 A1* | 8/2004 | Pacenti | ............ | A47J 45/068 99/403 |
| 2005/0109219 A1* | 5/2005 | Minamigawa | ............ | A47J 27/06 99/403 |
| 2005/0115948 A1* | 6/2005 | Simic-Glavaski | ............ | A47J 27/00 219/438 |
| 2005/0161458 A1* | 7/2005 | Cheng | ............ | A47J 27/002 220/573.1 |
| 2006/0019001 A1* | 1/2006 | Levinson | ............ | A23L 5/15 426/243 |
| 2006/0091183 A1* | 5/2006 | Cheng | ............ | A47J 27/002 228/101 |
| 2007/0201944 A1* | 8/2007 | Munari | ............ | A47J 45/061 403/109.1 |
| 2009/0049650 A1* | 2/2009 | Cuillery | ............ | A42B 3/322 16/425 |
| 2012/0145698 A1* | 6/2012 | Von Seidel | ............ | A47J 27/21016 219/438 |
| 2012/0217252 A1* | 8/2012 | Jung | ............ | A47J 27/002 220/573.4 |
| 2013/0216673 A1* | 8/2013 | Storek | ............ | A47J 27/62 426/509 |
| 2014/0326733 A1* | 11/2014 | Park | ............ | A47J 27/002 220/573.1 |

FOREIGN PATENT DOCUMENTS

| KR | 10-0935597 B1 | 1/2010 |
|---|---|---|
| KR | 10-2012-0140040 A | 12/2012 |

\* cited by examiner

DOUBLE COOKING CONTAINER HAVING IMPROVED STABILITY AND HEATING EFFICIENCY

CROSS-REFERENCE TO RELATED APPLICATION(S)

This application is a continuation of co-pending International Application No. PCT/KR2014/011959, filed Dec. 5, 2014, which designated the United States and was not published in English, and which claims priority to Korean Application No. 10-2013-0150355, filed Dec. 5, 2013, both of which applications are incorporated herein by reference in their entirety.

BACKGROUND

Generally, if heat is applied to the underside of a cooking container, the food contained in the cooking container is cooked through the heat conduction from the underside of the cooking container, and at this time, the underside of the cooking container is formed of a single layer so as to achieve fast heat transmission therethrough.

If the underside of the cooking container is formed of the single layer, however, the food contained in the cooking container is differently heated according to its position in the cooking container, so that a portion of the food is burnt or another portion is half-cooked.

So as to solve the above-mentioned problems of the cooking container having the single layer, accordingly, there has been proposed a cooking container which has a double structure configured to have an outer cylinder and an inner cylinder in such a manner as to form a space therebetween, so that the food contained in the cooking container is uniformly heated.

On the other hand, the cooking container having the double underside structure further has a fine discharge hole of a diameter of 1 mm or under formed on a portion of the outer cylinder, thus preventing the occurrence of safety accidents like explosion due to the expansion of volume of the internal space thereof.

Since the cooking container should be washed, however, foreign matters like water may be easily introduced into the internal space through the discharge hole, and when the water is heated, it turns to water vapor to increase the volume to about 1000 times, so that if the double cooking container is used without any carefulness, it may be exploded or deformed in shape. If the size of discharge hole is increased with no plan to solve the above-mentioned problems, however, the heat efficiency of the cooking container is drastically reduced to further extend the cooking time thereof.

Accordingly, there is a need for the development of a new double cooking container capable of preventing the occurrence of safety accidents or deformation of shape even when foreign matters like water are introduced thereinto and minimizing the reduction of heat efficiency caused by the formation of the discharge hole.

BRIEF SUMMARY

The present disclosure relates to a double cooking container having improved stability and heating efficiency, and more particularly, to a double cooking container having improved stability and heating efficiency that is configured to have a double structure in which an inner cylinder is disposed inside an outer cylinder, a heat retaining space is formed by inserting the inner cylinder into the inside of the outer cylinder in such a manner as to maintain a predetermined interval between the bottom of the outer cylinder and the underside of the inner cylinder, and a side fluid channel is formed between the outer cylinder and the inner cylinder to communicate with the heat retaining space, wherein the outer cylinder has one or a plurality of discharge holes formed thereon in such a manner as to communicate with the side fluid channel, and the entire sectional area of the discharge holes is controlled to be within a predetermined range in order to obtain high heating efficiency and stability.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Exemplary embodiments of the present disclosure will be described below in more detail with reference to the accompanying drawings. The present disclosure may, however, be embodied in different forms and should not be construed as limited to the embodiments set forth herein.

The present disclosure has been made in view of the above-mentioned problems occurring in the related art, and it is an object of the present disclosure to provide a double cooking container having improved stability and heating efficiency that is capable of controlling the entire sectional area of discharge holes within a predetermined range, thus preventing the occurrence of safety accidents or deformation of shape even when foreign matters like water are introduced thereinto and minimizing the reduction of heat efficiency caused by the formation of the discharge holes.

To accomplish the above-mentioned object, according to the present disclosure, there is provided a double cooking container having improved stability and heating efficiency that is configured to have a double structure in which an inner cylinder is disposed inside an outer cylinder, a heat retaining space is formed by inserting the inner cylinder into the inside of the outer cylinder in such a manner as to maintain a predetermined interval between the bottom of the outer cylinder and the underside of the inner cylinder, and a side fluid channel is formed between the outer cylinder and the inner cylinder to communicate with the heat retaining space, wherein the outer cylinder has one or a plurality of discharge holes formed thereon in such a manner as to communicate with the side fluid channel, and the entire sectional area of the discharge holes is controlled to be within the range of 1 to 25 πmm² in order to obtain high heating efficiency and stability.

According to the present invention, desirably, the heat retaining space has a height in the range of 3 to 15 mm and a volume in the range of 7 to 15 ml, so that total cooking time is reduced and the food contained in the double cooking container is not burnt.

According to the present invention, desirably, one or the plurality of discharge holes has a diameter of more than 2 mm to prevent the double cooking container from being exploded or deformed in shape due to instant volume expansion by the generation of water vapor if water enters the interior of the heat retaining space, and further, one or the plurality of discharge holes 5 has a diameter in the range of 2 to 6 mm to prevent the reduction of heat efficiency and the introduction of foreign matters.

According to the present disclosure, desirably, the double cooking container further includes a bimetal sensor mounted on one side of the side fluid channel where one or the plurality of discharge holes is formed in such a manner as to be automatically open and closed according to the temperature of the heat retaining space and the side fluid channel, and at this time, desirably, one or the plurality of discharge holes 5 has a diameter in the range of 2 to 10 mm to prevent the reduction of heat efficiency and the introduction of foreign matters.

According to the present disclosure, the double cooking container is capable of controlling the entire sectional area of discharge holes within the predetermined range, unlike the conventional double cooking container, thus preventing the occurrence of safety accidents or deformation of shape even when foreign matters like water are introduced thereinto and minimizing the reduction of heat efficiency caused by the formation of the discharge holes.

Hereinafter, an explanation on a double cooking container having improved stability and heating efficiency according to the present invention will be in detail given with reference to the attached drawings.

Figure 1:
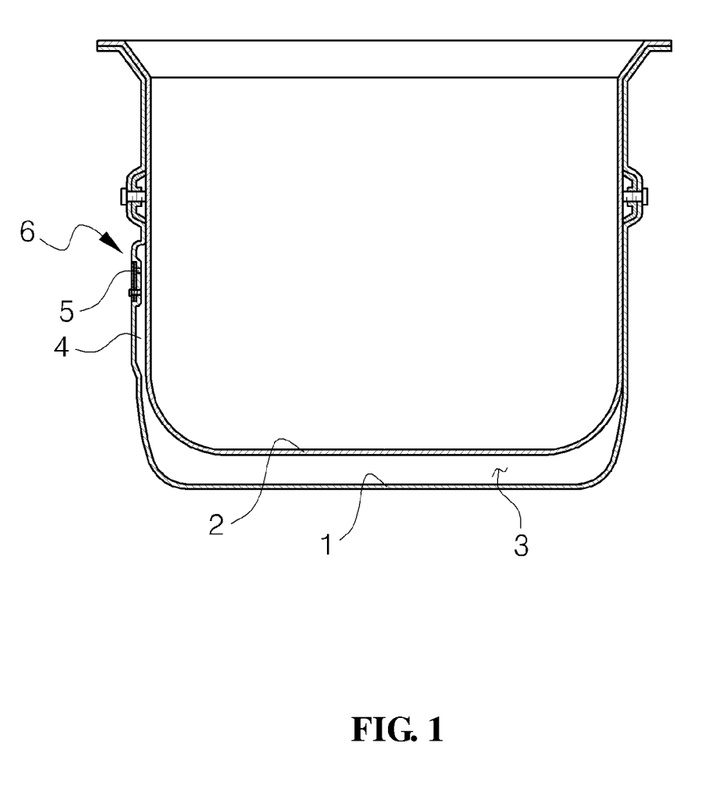
FIG. 1 is a sectional view showing a configuration of a double cooking container according to the present disclosure.

As shown in FIG. 1, a double cooking container according to the present disclosure includes: an outer cylinder 1; an inner cylinder 2 disposed inside the outer cylinder 1; a heat retaining space 3 formed by inserting the inner cylinder 2 into the inside of the outer cylinder 1 to maintain a predetermined interval between the bottom of the outer cylinder 1 and the underside of the inner cylinder 2; and a side fluid channel 4 formed between the outer cylinder 1 and the inner cylinder 2 to communicate with the heat retaining space 3, wherein the outer cylinder 1 has one or a plurality of discharge holes 5 formed thereon in such a manner as to communicate with the side fluid channel 4, and the entire sectional area of one or the plurality of discharge holes 5 is controlled to be within the range of 1 to 25 πmm² in order to obtain high heating efficiency and stability.

In case of a general cooking container having a double structure, the outer cylinder has a fine discharge hole having a diameter of 1 mm or under formed on a portion thereof so as to prevent safety accidents from happening when the volume thereof is expanded by means of heating. In the process of washing the cooking container, however, foreign materials like water may enter the inner space of the cooking container through the discharge hole, and when water is boiled and turns to water vapor, the volume of the water is increased about 1700 times, so that even if the discharge hole is formed, explosion of the cooking container or the deformation in the shape of the cooking container may frequently occur due to the lack of carefulness. If the size of the discharge hole is increased with no plan to solve the above-mentioned problems, however, the heat efficiency of the cooking container may be lowered to cause the cooking time to be undesirably extended.

According to the present disclosure, therefore, one discharge hole 5 or a plurality of discharge holes 5 is formed on the outer cylinder 1 to communicate with the side fluid channel 4 in such a manner as to be controlled in the sectional area thereof within the range of 1 to 25 πmm², thus preventing explosion or deformation of shape of the cooking container and at the same time minimizing the reduction of the heat efficiency of the cooking container.

In this instance, it is best to maintain the height of the heat retaining space 3 in communication with the discharging holes 5 having the sectional area as mentioned above in the range of 3 to 15 mm, and the volume thereof in the range of 7 to 15 ml. General cooking containers have various diameters in the range of 16 to 32 cm according to their use purposes, but regardless of the sizes of the cooking containers, it is advantageous to maintain the height and volume of the heat retaining space 3 in the given ranges above.

Specifically, if the cooking container has a small diameter, the height of the heat retaining space 3 is raised to a given range to prevent the underside of the cooking container from being heated rapidly, thus preventing the food from being burnt; on the other hand, if the cooking container has a large diameter, the height of the heat retaining space 3 is lowered to a given range to prevent prolonging the cooking time.

On the other hand, if water enters the heat retaining space 3, the cooking container may be exploded or deformed in shape by means of the instant volume expansion by the generation of water vapor, and so as to prevent the explosion or deformation, accordingly, the discharge holes 5 having the above-mentioned sectional area have a diameter of at least 2 mm or more. So as to prevent the reduction of heat efficiency and the introduction of foreign matters, at this time, the discharge holes 5 desirably have a diameter in the range of 2 to 6 mm, more desirably in the range of 3 to 5 mm.

On the other hand, as shown in FIG. 1, a bimetal sensor 6 is mounted on one side of the side fluid channel 4 where the discharge holes 5 are formed in such a manner as to be automatically open and closed according to the temperature of the heat retaining space 3 and the side fluid channel 4. Accordingly, the bimetal sensor 6, which is mounted on one side of the side fluid channel 4, automatically opens and closes the discharge holes 5 according to the temperatures of the heat retaining space 3 and the side fluid channel 4.

The bimetal sensor 6 serves to close the discharge holes 5 until the heat retaining space 3 and the side fluid channel 4 reach the given temperature, thus raising the heat efficiency upon initial heating and preventing the introduction of foreign matters during washing. So as to prevent the reduction of heat efficiency and the introduction of foreign matters, at this time, the discharge holes 5 on which the bi-metal sensor 6 is mounted have a diameter in the range of 2 to 10 mm.

The bimetal sensor 6 is made of a bimetal material having two metals with expanded lengths differently set with respect to a given temperature, and instead of the bimetal sensor 6, of course, a variety of devices operating under a set temperature or pressure may be adopted. The opening and closing device is provided with a leaf spring operating above a set pressure.

The bimetal sensor 6 is mounted on the discharge holes 5 in various ways applicable commercially. As shown in FIG. 1, the discharge holes 5 are formed on the upper side of the side fluid channel 4 in such a manner as to communicate with the heat retaining space 3, and a hinge fastener to which a hinge fastening screw is fastened is formed on the lower side of the side fluid channel 4. Accordingly, the bimetal sensor 6 has an embossed portion protruding from the upper side thereof to close the discharge holes 5 and a through hole formed on the lower side thereof in such a manner as to be fastened by means of the hinge fastening screw.

If the temperature of the heat retaining space 3 and the side fluid channel 4 is more than the given set temperature, under the above configuration, the bimetal sensor 6 rotates in a direction distant from the outer cylinder 1 around the fastened portion of the lower side thereof, thus allowing the embossed portion thereof to be separated from the discharge holes 5.

If the leaf spring is used instead of the bimetal sensor 6, the air of the heat retaining space 3 pushes the leaf spring and is thus discharged to the outside when the interior of the heat retaining space 3 is heated to a high temperature and a high pressure.

On the other hand, the fitting of the inner cylinder 2 to the inside of the outer cylinder 1 is carried out in a variety of ways, and as shown in FIG. 1, the side surface of the outer cylinder 1 is pressurized through fastening of fixing members to allow the inner cylinder 2 to be fitted to the outer cylinder 2. Otherwise, a separate plastic process or coating may be applied to fit the inner cylinder 2 to the outer cylinder 1. Further, handles may be mounted on the cooking container if necessary.

According to various embodiments the present disclosure, hereinafter, the double cooking container having improved stability and heating efficiency will be explained. However, the present disclosure is not restricted by the embodiments, and it should be appreciated that those skilled in the art can change or modify the embodiments by the appended claims.

FIRST EMBODIMENT

Measurement of Deformation in Shape of Double Cooking Container According to Diameters of Discharge Holes A double cooking container having a diameter of 24 cm was prepared according to diameters of discharge holes, and the double cooking container had a double structure in which an inner cylinder was disposed inside an outer cylinder and a heat retaining space formed between the bottom of the outer cylinder and the underside of the inner cylinder had a volume of 10 ml. After 1 ml of water was introduced into the heat retaining space, the double cooking container was heated over high heat by means of a gas range for household purposes until the water contained therein was boiled, thus measuring whether the shape of the double cooking container was deformed or not.

TABLE 1

| Size of Discharge Hole | Shape Deformation |
| --- | --- |
| 1.0 mm | Deformed |
| 2.0 mm | Weakly deformed |
| 3.0 mm | Not deformed |

It was checked that the above results were similar as each other regardless of the number of discharge holes through repeated experiments. Accordingly, it can be found that the size of each discharge hole has to be more than 2 mm so as to prevent the occurrence of safety accidents or the deformation of the product during cooking if the foreign matters like water are introduced therethrough.

SECOND EMBODIMENT

Figure 2A:
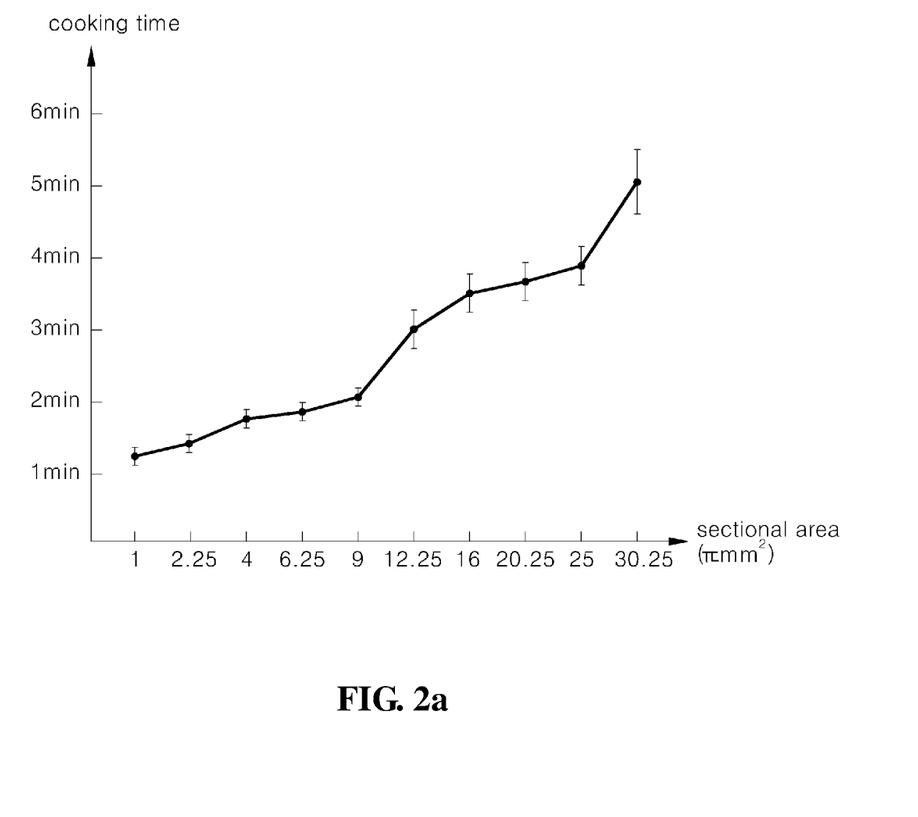
FIG. 2a is a graph showing the changes in cooking time according to the sectional area of one discharge hole if the double cooking container according to the present disclosure has one discharge hole.

Measurement of Change in Cooking Time According to Sectional Area of Discharge Hole in Double Cooking Container Having One Discharge Hole A double cooking container having a diameter of 24 cm was prepared according to sectional areas (of more than a diameter of 2 mm) of the discharge hole, and the double cooking container had a double structure in which an inner cylinder was disposed inside an outer cylinder, a heat retaining space formed between the bottom of the outer cylinder and the underside of the inner cylinder had a volume of 10 ml, and a single discharge 2 hole was formed. The double cooking container was heated over high heat by means of a gas range for household purposes until the water contained therein was boiled, and the time taken until the water was boiled was measured, which was shown in FIG. 2a. As appreciated from the graph of FIG. 2a, it was found that the cooking time was drastically increased from when the sectional area of the discharge hole was over 25 mm$^2$.

THIRD EMBODIMENT

Figure 2B:
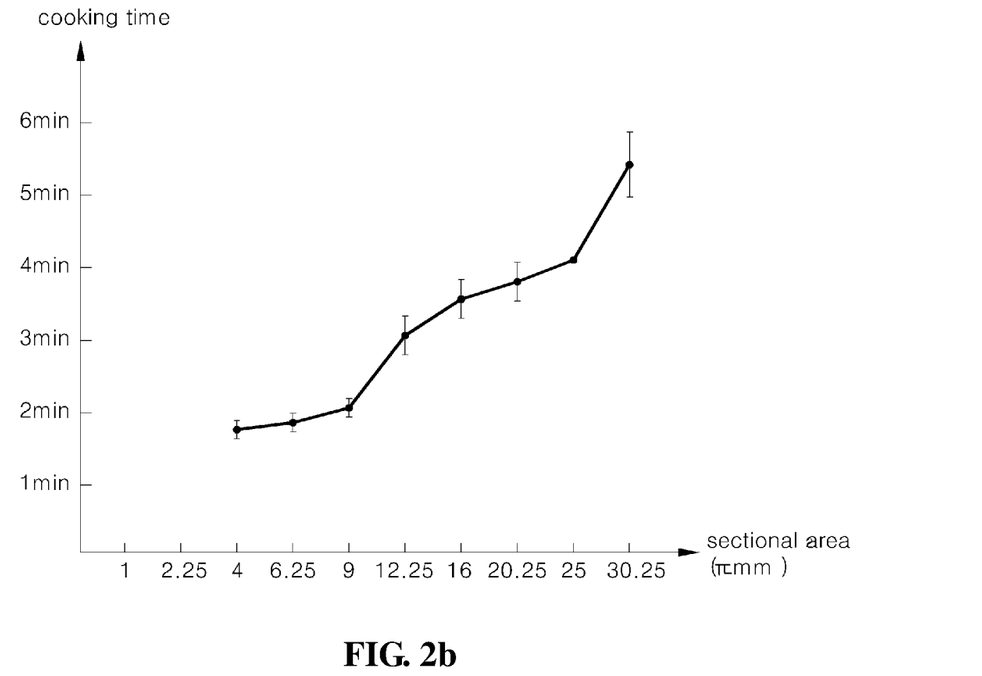
FIG. 2b is a graph showing the changes in cooking time according to the sectional area of two discharge holes if the double cooking container according to the present disclosure has two discharge holes.

Measurement of Change in Cooking Time According to Sectional Area of Discharge Hole in Double Cooking Container Having Two Discharge Holes A double cooking container having a diameter of 24 cm was prepared according to sectional areas (of more than a diameter of 2 mm) of the discharge holes, and the double cooking container had a double structure in which an inner cylinder was disposed inside an outer cylinder, a heat retaining space formed between the bottom of the outer cylinder and the underside of the inner cylinder had a volume of 10 ml, and two discharge holes having the same sizes were formed. The double cooking container was heated over high heat by means of a gas range for household purposes until the water contained therein was boiled, and the time taken until the water was boiled was measured, which was shown in FIG. 2b. As appreciated from the graph of FIG. 2b, it was found that the cooking time was drastically increased from when the sectional area of the discharge hole was over 25 mm$^2$.

FOURTH EMBODIMENT

Figure 2C:
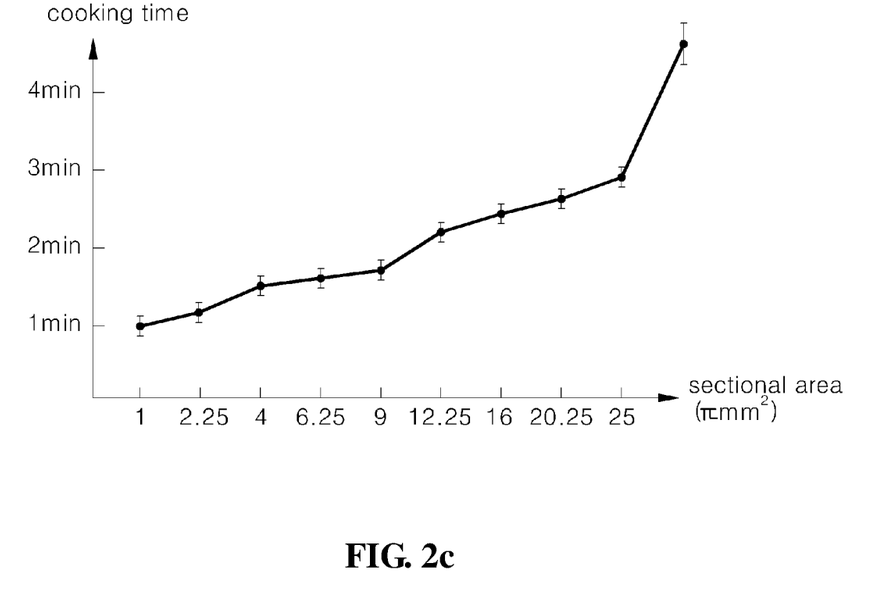
FIG. 2c is a graph showing the changes in cooking time according to the sectional area of discharge holes if the double cooking container according to the present disclosure has a bimetal sensor.

Measurement of Change in Cooking Time According to Sectional Area of Discharge Hole in Double Cooking Container Having Bi-Metal Sensor A double cooking container having a diameter of 24 cm was prepared according to sectional areas (of more than a diameter of 2 mm) of the discharge hole in the same manner as in the second embodiment of the present disclosure. The double cooking container was heated over high heat by means of a gas range for household purposes until the water contained therein was boiled, and the time taken until the water was boiled was measured, which was shown in FIG. 2c. As appreciated from the graph of FIG. 2c, it was found that when the bimetal sensor was mounted, the heat efficiency was more improved, and further, it was found that the cooking time was drastically increased from when the sectional area of the discharge hole was over 25 $\pi$mm$^2$.

While the present disclosure has been described with reference to the particular illustrative embodiments, it is not to be restricted by the embodiments but only by the appended claims. It is to be appreciated that those skilled in the art can change or modify the embodiments without departing from the scope and spirit of the present disclosure.

The embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

The invention claimed is:

1. A double cooking container comprising:
   an outer cylinder;
   an inner cylinder disposed inside the outer cylinder;
   a heat retaining space defined between the inner cylinder and the outer cylinder; and
   a side fluid channel defined between the outer cylinder and the inner cylinder to communicate with the heat retaining space, wherein the outer cylinder includes one or more discharge holes defined therein in such a manner as to communicate with the side fluid channel; and
   a sensor device mounted on the one or more discharge holes having an embossed portion protruding from an upper side of the sensor device to close the one or more discharge holes;
   wherein an entire sectional area of the one or more discharge holes is in the range of 1 to 25 $\pi$mm$^2$,
   wherein the one or more discharge holes have a diameter in the range of 2 to 6 mm, and
   wherein the heat retaining space has a height in the range of 3 to 15 mm.

2. The double cooking container according to claim 1, wherein the sensor is a bimetal sensor disposed on one side of the side fluid channel, wherein the one or more discharge holes are operable to automatically open and close according to a temperature of the heat retaining space and the side fluid channel.

\* \* \* \* \*